(12) United States Patent
Raikar et al.

(10) Patent No.: US 9,914,420 B2
(45) Date of Patent: Mar. 13, 2018

(54) DRIVER AIRBAG MODULE NEW LOCK SPRING DESIGN PROPOSAL FOR VISUAL VERIFICATION OF MODULE'S ROBUST ATTACHMENT TO THE STEERING WHEEL

(71) Applicant: GM Global Technology Operations LLC, Detroit, MI (US)

(72) Inventors: Sadanand N. Raikar, Sterling Heights, MI (US); Mukesh Amin, Canton, MI (US); Jeffrey J. Schultz, Grand Blanc, MI (US); Peggy M. Gossiaux, Grand Blanc, MI (US); James R. Furstenau, St. Clair, MI (US)

(73) Assignee: GM GLOBAL Technology Operations LLC, Detroit, MI (US)

( * ) Notice: Subject to any disclaimer, the term of this patent is extended or adjusted under 35 U.S.C. 154(b) by 0 days.

(21) Appl. No.: 15/079,225

(22) Filed: Mar. 24, 2016

(65) Prior Publication Data
US 2016/0297390 A1    Oct. 13, 2016

Related U.S. Application Data

(60) Provisional application No. 62/146,645, filed on Apr. 13, 2015.

(51) Int. Cl.
*B60R 21/16*     (2006.01)
*B60R 21/203*    (2006.01)
*B60Q 5/00*      (2006.01)

(52) U.S. Cl.
CPC .......... *B60R 21/2035* (2013.01); *B60Q 5/003* (2013.01)

(58) Field of Classification Search
CPC ............................ B60R 21/2037; B60Q 5/003
USPC ........................... 280/731; 200/61.54, 61.55
See application file for complete search history.

(56) References Cited

U.S. PATENT DOCUMENTS

| 6,554,312 B2 * | 4/2003 | Sakane .................. B60Q 5/003 280/728.2 |
| 7,556,282 B2 * | 7/2009 | Vigeant ............... B60R 21/2035 280/728.2 |
| 7,566,071 B2 * | 7/2009 | Tsujimoto ........... B60R 21/2037 280/731 |
| 8,256,797 B2 * | 9/2012 | Sakurai ............... B60R 21/2037 200/61.55 |
| 8,419,052 B2 * | 4/2013 | Yamaji ................ B60R 21/2037 280/728.2 |

(Continued)

FOREIGN PATENT DOCUMENTS

| CN | 1833922 A    | 9/2006 |
| CN | 102442269 A  | 5/2012 |
| GB | 2269053 A    | 1/1994 |

OTHER PUBLICATIONS

Chinese Office Action dated Sep. 28, 2017 ; Application No, 201610226374.4; Applicant:GM Global Technology Operations LLC.; 6 pages.

*Primary Examiner* — Toan C To
(74) *Attorney, Agent, or Firm* — BrooksGroup

(57) ABSTRACT

A number of variations may include a product that may include a mounting bracket portion that may include a spring housing that may define at least one through hole. The product may further include a lock spring that may include a first end may be disposed within the at least one through hole such that the first end extends through the through hole and protrudes from the spring housing.

4 Claims, 4 Drawing Sheets

(56) References Cited

U.S. PATENT DOCUMENTS

| | | | |
|---|---|---|---|
| 8,500,156 B2* | 8/2013 | Banno | B60R 21/2037 280/728.2 |
| 9,120,453 B2* | 9/2015 | Obayashi | B62D 7/222 |
| 2001/0054810 A1* | 12/2001 | Sakane | B60Q 5/003 280/728.2 |
| 2006/0208470 A1* | 9/2006 | Tsujimoto | B60Q 5/003 280/731 |
| 2007/0152428 A1* | 7/2007 | Poli | B60R 21/2037 280/728.2 |
| 2012/0080868 A1* | 4/2012 | Banno | B60R 21/2037 280/728.2 |
| 2012/0313357 A1* | 12/2012 | Yamaji | B60R 21/203 280/731 |

* cited by examiner

DRIVER AIRBAG MODULE NEW LOCK SPRING DESIGN PROPOSAL FOR VISUAL VERIFICATION OF MODULE'S ROBUST ATTACHMENT TO THE STEERING WHEEL

CROSS REFERENCE TO RELATED APPLICATIONS

This application claims the benefit of U.S. Provisional Application No. 62/146,645 filed Apr. 13, 2015.

TECHNICAL FIELD

The field to which the disclosure generally relates includes lock springs.

BACKGROUND

The proper mounting of an airbag module to a steering wheel is often confirmed via the use of the lock spring wherein mounting the airbag module to a steering wheel creates an audible verification sound.

SUMMARY OF ILLUSTRATIVE VARIATIONS

A number of variations may include a product that may include a mounting bracket portion that may include a spring housing that may define at least one through hole. The product may further include a lock spring that may include a first end may be slidably disposed within the at least one through hole such that the first end extends through the through hole and protrudes from the spring housing.

A number of variations may include a product that may include a steering wheel that may include a mounting bracket portion that may include a spring housing that may define at least one through hole, the mounting bracket portion may further include at least one spring stopper and may define a first relief and a second relief. The product may further include a lock spring that may include a first end may be disposed within the at least one through hole such that the first end extends through the through hole and protrudes from the spring housing.

A number of variations may include a product that may include a steering wheel that may include a mounting bracket portion that may include a spring housing that may define at least one through hole, the mounting bracket portion may further include at least one spring stopper and may define a first relief and a second relief. The product may further include a lock spring that may include a first end may be disposed within the at least one through hole such that the first end extends through the through hole and protrudes from the spring housing.

Other illustrative variations within the scope of the invention will become apparent from the detailed description provided hereinafter. It should be understood that the detailed description and enumerated variations, while disclosing optional variations, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses. The following description of variants is only illustrative of components, elements, acts, products, and methods considered to be within the scope of the invention and are not in any way intended to limit such scope by what is specifically disclosed or not expressly set forth. The components, elements, acts, products, and methods as described herein may be combined and rearranged other than as expressly described herein and still are considered to be within the scope of the invention.

Figure 1:
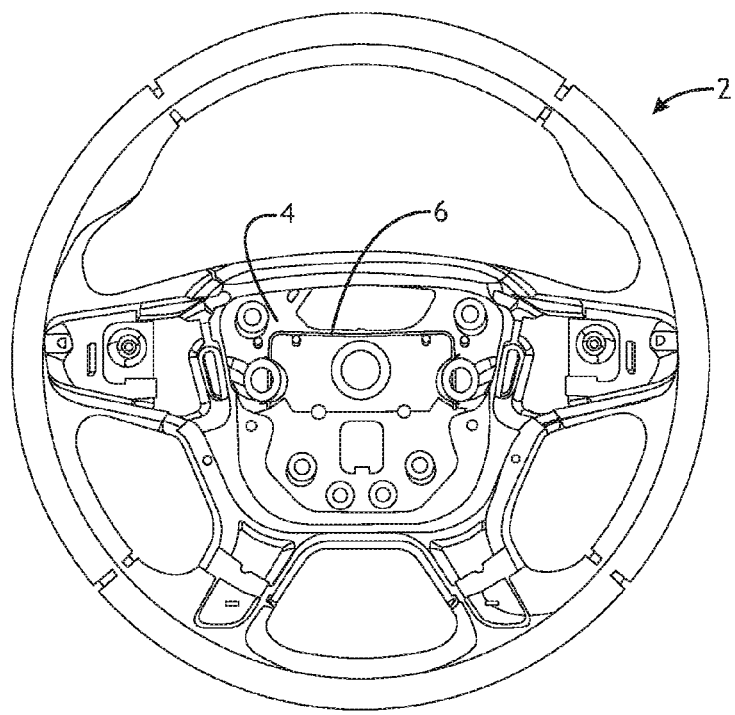
FIG. 1 illustrates a steering wheel having a lock spring for mounting an air bag module.

FIG. 1 illustrates a steering wheel 2 having air bag mounting portion 4 having a lock spring 6 received therein.

Figure 2:
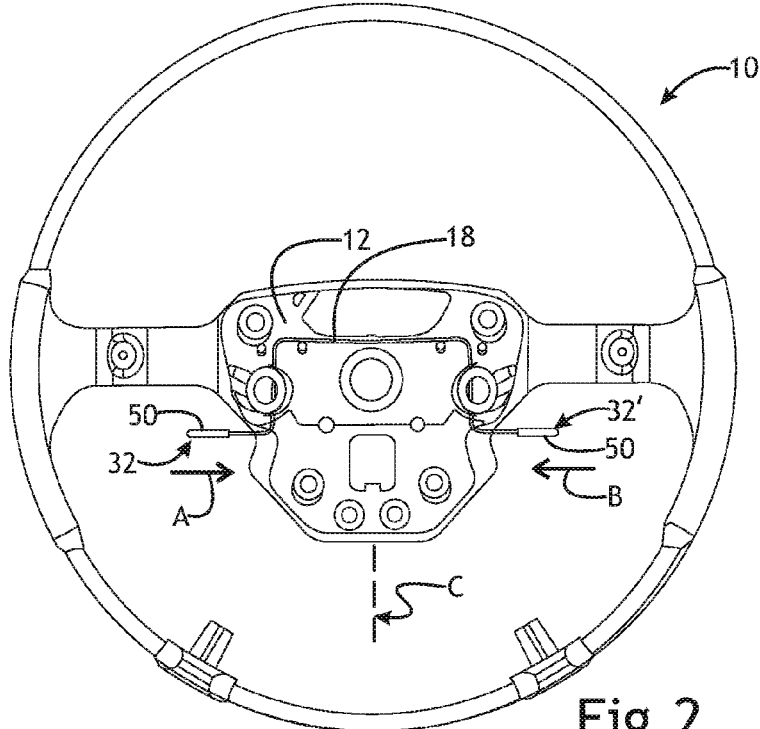
FIG. 2 illustrates a lock spring having a portion thereof received in the air bag mounting portion of a steering wheel according to a number of variations.
Figure 3:
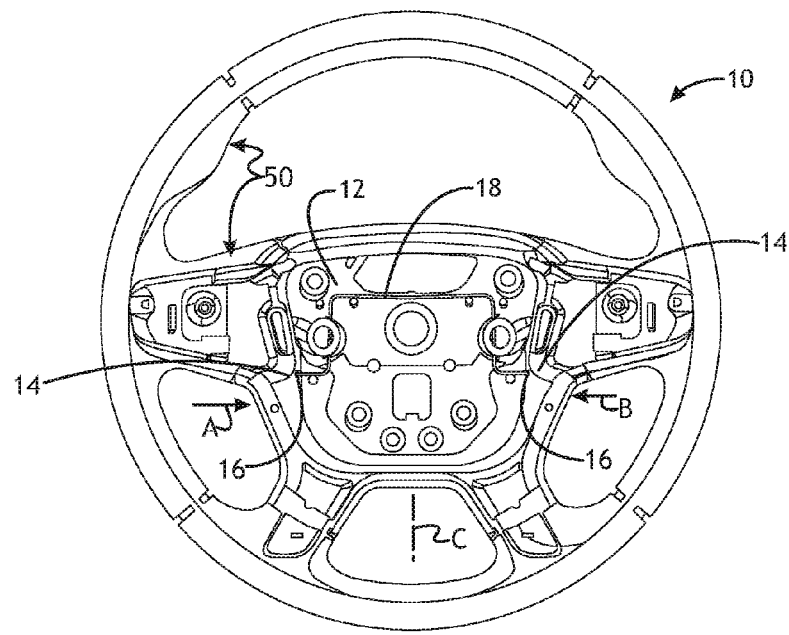
FIG. 3 illustrates a steering wheel having a lock spring for mounting an air bag module with additional components according to a number of variations.
Figure 4:
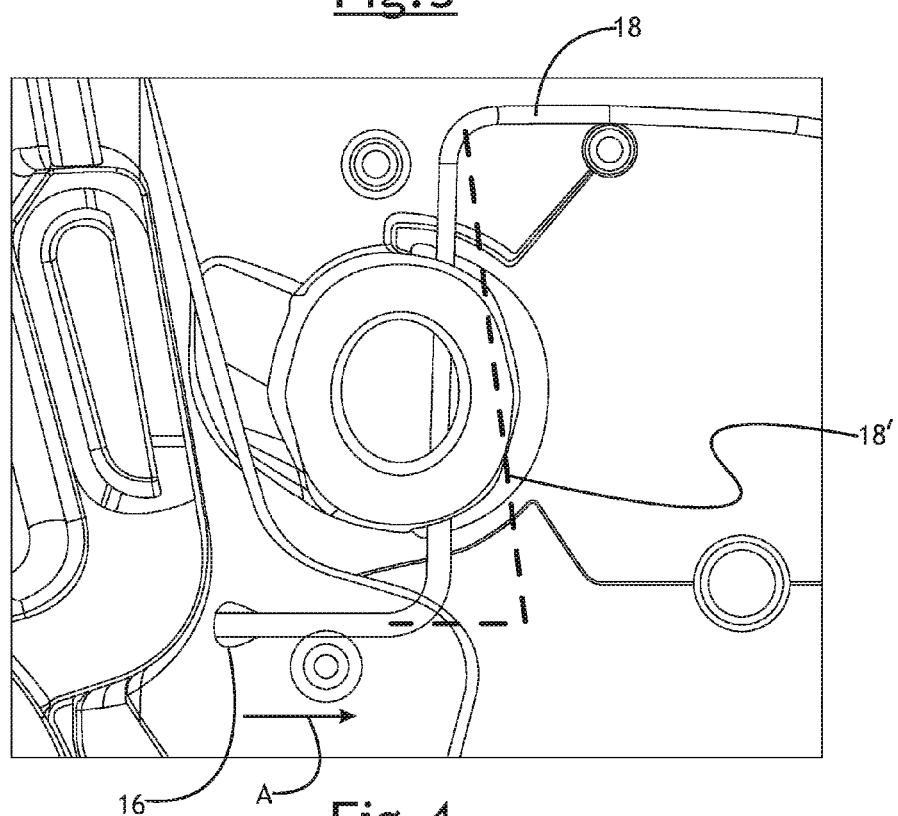
FIG. 4 is an enlarged view of a portion of steering wheel having a lock spring for mounting an air bag module and illustrating the movement of the lock spring according to a number of variations.

Referring to FIGS. 2-4; a steering wheel hub 10 may include a mounting bracket portion 12 that may include a spring housing 14 that may define at least one through hole 16. A lock spring 18 may be disposed within the at least one through hole 16 and the spring housing 14 and may include a first end 32 extending through the at least one through hole 16 and spring housing 14. The lock spring 18 may have first and second ends 32, 32'. The first end 32 on the left hand side facing the steering wheel in a mounted position in the vehicle may be constructed and arranged to move in a direction indicated by arrow A toward an imaginary center radial line C running the steering wheel when the air bag module is properly mounted to the steering wheel thereby providing a visual verification that the air bag has been properly mounted. The second end 32' on the right hand side facing the steering wheel in a mounted position in the vehicle may be constructed and arranged to move in a direction indicated by arrow B toward an imaginary center radial line C running the steering wheel when the air bag module is properly mounted to the steering wheel thereby providing a visual verification that the air bag has been properly mounted. Visual verification may be best seen from the back side of the steering wheel closest to a vehicle dash board. In a number of variations a portion of the lock spring 18 may be moved or deflected as illustrated by phantom line 18' to cause one of the ends 32 or 32' of the lock spring 18 to move toward an imaginary center radial line C running the steering wheel when the air bag module is properly mounted to the steering wheel thereby providing a visual verification that the air bag has been properly mounted. Referring to FIG. 2, in a number of variations a portion of the lock spring 18 near one or both ends 32, 32' may include an easily visible color such as, but not limited to, yellow, red or green. The color may be added to ends 32, 32' of the lock spring 18 by painting the ends 32, 32' or by sliding a plastic tip of each end 32, 32' or by other suitable means.

Referring to FIGS. 5-8; in a number of variations, a steering wheel hub 10 may include a mounting bracket portion 12 that may include a spring housing 14 may define at least one through hole 16. A lock spring 18 may be disposed within the at least one through hole 16 and spring housing 14 and may include a first end 32 extending through the at least one through hole 16 and spring housing 14. The lock spring 18 may include at least one integrated horn spring 20. The mounting bracket portion 12 may define a first relief 28 and a second relief 30 as well as at least one spring stopper 26. An airbag module 32 may include a snap-lock 22 that may define a channel 24 constructed and arranged to receive the lock spring 18.

Figure 5:
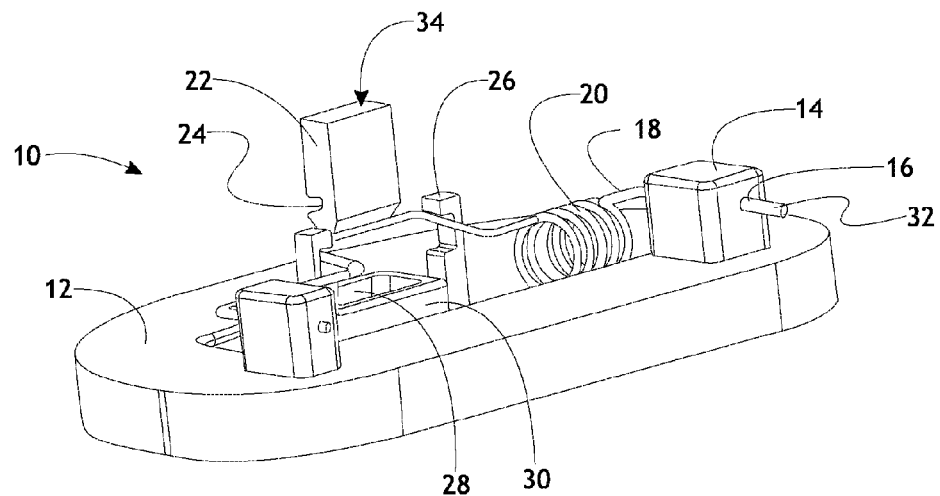
FIG. 5 illustrates one variation of a product including a lock spring for attaching an airbag module to a steering wheel.
Figure 6:
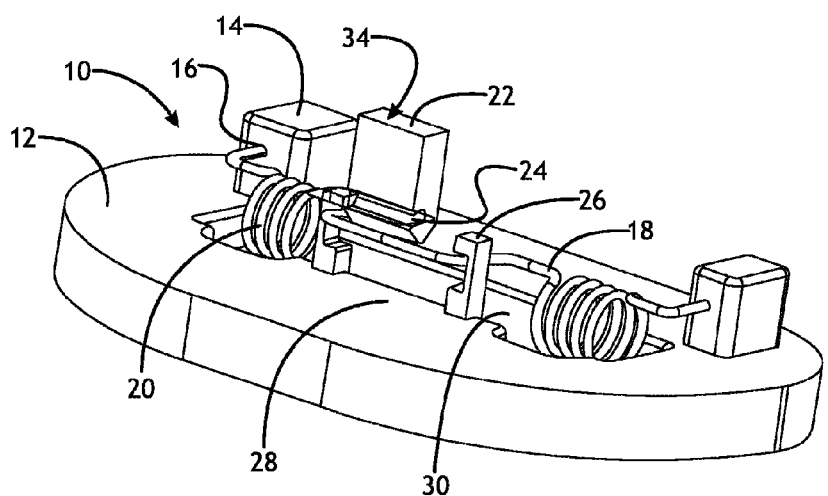
FIG. 6 illustrates one variation of a product including a lock spring for attaching an airbag module to a steering wheel.
Figure 7:
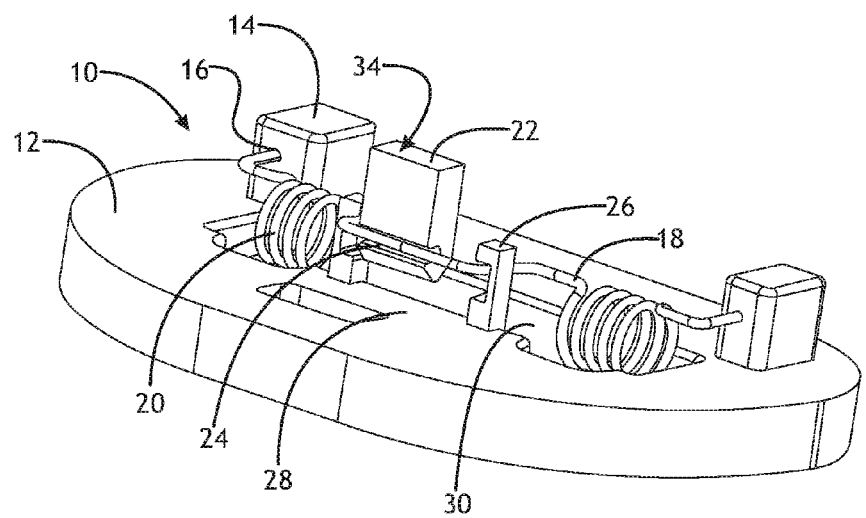
FIG. 7 illustrates one variation of a product including a lock spring for attaching an airbag module to a steering wheel.
Figure 8:
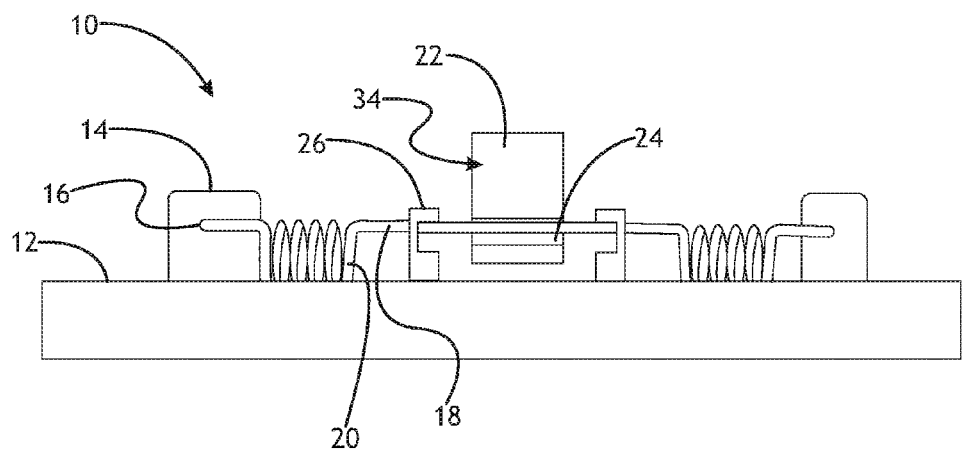
FIG. 8 illustrates one variation of a product including a lock spring for attaching an airbag module to a steering wheel.

In practice and in use, the mounting bracket portion 12 may be constructed and arranged to receive an airbag module 32 wherein the airbag module 32 may be mounted on the mounting bracket portion 12 via the snap-lock 22 mating with the lock spring 18. As best seen in FIG. 5, when the airbag module 34 is not mounted to the mounting bracket portion 12, the first end 32 of the lock spring 18 may extend a first distance from the spring housing 14. An airbag module 34 having at least one snap-lock 18 may be lowered toward a mounting bracket portion 12 such that the snap-lock 22 engages a lock spring 18 mated to the mounting bracket portion 12 via the spring housing 14 and the at least one through hole 16. As best seen in FIGS. 5 and 7, as the airbag module 34 having a snap-lock 22 is lowered, the snap-lock 22 may temporarily bias the lock spring horizontally relative to the mounting bracket portion 12 such that the first end 32 may slide within the at least one through hole 16 so that the first end 32 of the lock spring 18 extends a second distance from the spring housing 14, which is less than the first distance and provide visual verification to a user that the snap-lock 22 has engaged the lock spring 18. As best seen in FIG. 7, the snap-lock 22 may define a channel 24 that may receive the lock spring 18 after the airbag module 34 has been installed and the first end 32 may again slide within the at least one through hole 16 and provide visual verification to a user that the snap-lock 22 has engaged the lock spring 18.

The lock spring 18 may include an integrated horn spring 20. The horn spring 20 may be constructed and arranged to bias an installed airbag module 32 away from the mounting bracket portion 12 of the steering wheel 10. In practice and in use, a user may depress the airbag module 34 thereby honking the horn of a vehicle, the horn spring 20 may then return the airbag module 34 to its original position after the user has finished depressing it. The first end 32 may further allow a user to, in a service manner, release the snap-lock 22 from the lock spring 18 by pressing the first end 32 into the at least on through hole 16 such that the lock spring 18 disengages the channel 24 of the snap-lock 22 and the airbag module 32 may be removed from the mounting bracket portion 12.

According to variation 1, a product may include a mounting bracket portion that may include a spring housing that may define at least one through hole. The product may further include a lock spring that may include a first end may be slidably disposed within the at least one through hole such that the first end extends through the through hole and protrudes from the spring housing.

Variation 2 may include a product as set forth in variation 1 wherein the lock spring may include an integrated horn spring.

Variation 3 may include a product as set forth in variation 1 or 2 wherein the mounting bracket portion defines a first relief and a second relief.

Variation 4 may include a product as set forth in variation 1 through 3 wherein the mounting bracket portion may further include at least one spring stopper.

According to variation 5, a product may include a steering wheel that may include a mounting bracket portion that may include a spring housing that may define at least one through hole. The mounting bracket portion may further include at least one spring stopper and may define a first relief and a second relief. The product may further include a lock spring that may include a first end may be disposed within the at least one through hole such that the first end extends through the through hole and protrudes from the spring housing.

Variation 6 may include a product as set forth in variation 5 wherein the lock spring may include and integrated horn spring.

Variation 7 may include a product as set forth in variations 5 or 6 wherein the mounting bracket portion defines a first relief and a second relief.

According to variation 8, a product may include an airbag module assembly that may include an airbag module having a snap-lock that defines a channel. The product may further include a steering wheel that may include a mounting bracket portion that may include a spring housing that may define at least one through hole, the mounting bracket portion may further include at least one spring stopper and may define a first relief and a second relief. The product may further include a lock spring that may include a first end may be disposed within the at least one through hole such that the first end extends through the through hole and protrudes from the spring housing.

Variation 9 may include a product as set forth in variation 8 wherein the lock spring may include and integrated horn spring.

The above description of variations of the invention is merely demonstrative in nature and, thus, variations thereof are not to be regarded as a departure from the spirit and scope of the inventions disclosed within this document.

What is claimed is:

1. A product comprising:
   an airbag module assembly comprising an airbag module having a snap-lock defining a channel;
   a steering wheel comprising a mounting bracket portion comprising a spring housing defining at least one through hole, at least one spring stopper, and defining at least a first relief and a second relief; and
   a lock spring comprising a first end disposed within the at least one through hole such that the first end extends through the through hole and protrudes from the spring housing.

2. A product as set forth in claim 1 wherein the mounting bracket portion defines a first relief and a second relief.

3. A product as set forth in claim 1 wherein the mounting bracket portion comprises at least one spring stopper.

4. A product as set forth in claim 1 wherein the lock spring comprises an integrated horn spring.

* * * * *